US006754740B2

(12) United States Patent
Happonen

(10) Patent No.: US 6,754,740 B2
(45) Date of Patent: Jun. 22, 2004

(54) INTERFACE APPARATUS FOR CONNECTING DEVICES OPERATING AT DIFFERENT CLOCK RATES, AND A METHOD OF OPERATING THE INTERFACE

(75) Inventor: Aki Happonen, Oulu (FI)

(73) Assignee: Nokia Corporation, Espoo (FI)

( * ) Notice: Subject to any disclaimer, the term of this patent is extended or adjusted under 35 U.S.C. 154(b) by 422 days.

(21) Appl. No.: 09/734,070

(22) Filed: Dec. 11, 2000

(65) Prior Publication Data

US 2001/0016885 A1 Aug. 23, 2001

Related U.S. Application Data

(63) Continuation of application No. PCT/EP98/03642, filed on Jun. 17, 1998.

(51) Int. Cl.[7] ................................................ G06F 3/00
(52) U.S. Cl. ............................. 710/52; 710/33; 710/53; 710/60
(58) Field of Search ........................... 710/33, 52, 53, 710/60

(56) References Cited

U.S. PATENT DOCUMENTS

| | | | |
|---|---|---|---|
| 4,298,954 A | | 11/1981 | Bigelow et al. |
| 4,888,741 A | * | 12/1989 | Malinowski ............ 365/230.05 |
| 5,371,877 A | | 12/1994 | Drako et al. |
| 6,033,441 A | * | 3/2000 | Herbert ........................ 709/400 |
| 6,055,285 A | * | 4/2000 | Alston ........................... 375/372 |
| 6,130,891 A | * | 10/2000 | Lam et al. .................... 370/401 |
| 6,473,818 B1 | * | 10/2002 | Niu et al. ..................... 711/168 |

FOREIGN PATENT DOCUMENTS

| | | |
|---|---|---|
| EP | 0317 863 A1 | 5/1989 |
| EP | 0530 363 A1 | 3/1993 |
| EP | 0649 097 a1 | 4/1995 |
| WO | WO 96/38793 | 12/1996 |
| WO | Wo 98/52123 | 11/1998 |

OTHER PUBLICATIONS

International Search Report for PCT/EP98/03642.

* cited by examiner

*Primary Examiner*—Jeffrey Gaffin
*Assistant Examiner*—Niketa I. Patel
(74) *Attorney, Agent, or Firm*—Squire, Sanders & Dempsey L.L.P.

(57) ABSTRACT

The invention proposes an apparatus (and method) for transferring data between a first device (1) and a memory area of memory means (3a; F_REG) of a second device (3), the apparatus comprising buffer registers for temporarily storing the data (DATA) to be transferred and the address (ADDR) of the memory area to and/or from which the data are to be transferred, and a control means (EL, CTRL) for controlling said buffer registers, characterized by at least two groups of buffer registers ([DATA_REG1, ADD_REG1], [DATA_REG2, ADD_REG2]) for storing data and associated addresses transmitted in consecutive data transfer operations, and in that said control means (CTRL) is adapted to generate a control signal (ENABLE) for alternately switching between a first group of buffer registers ([DATA_REG1, ADD_REG1]) and a second group of buffer registers ([DATA_REG2, ADD_REG2]) after each of a respective one of consecutive data transfer operations.

12 Claims, 6 Drawing Sheets

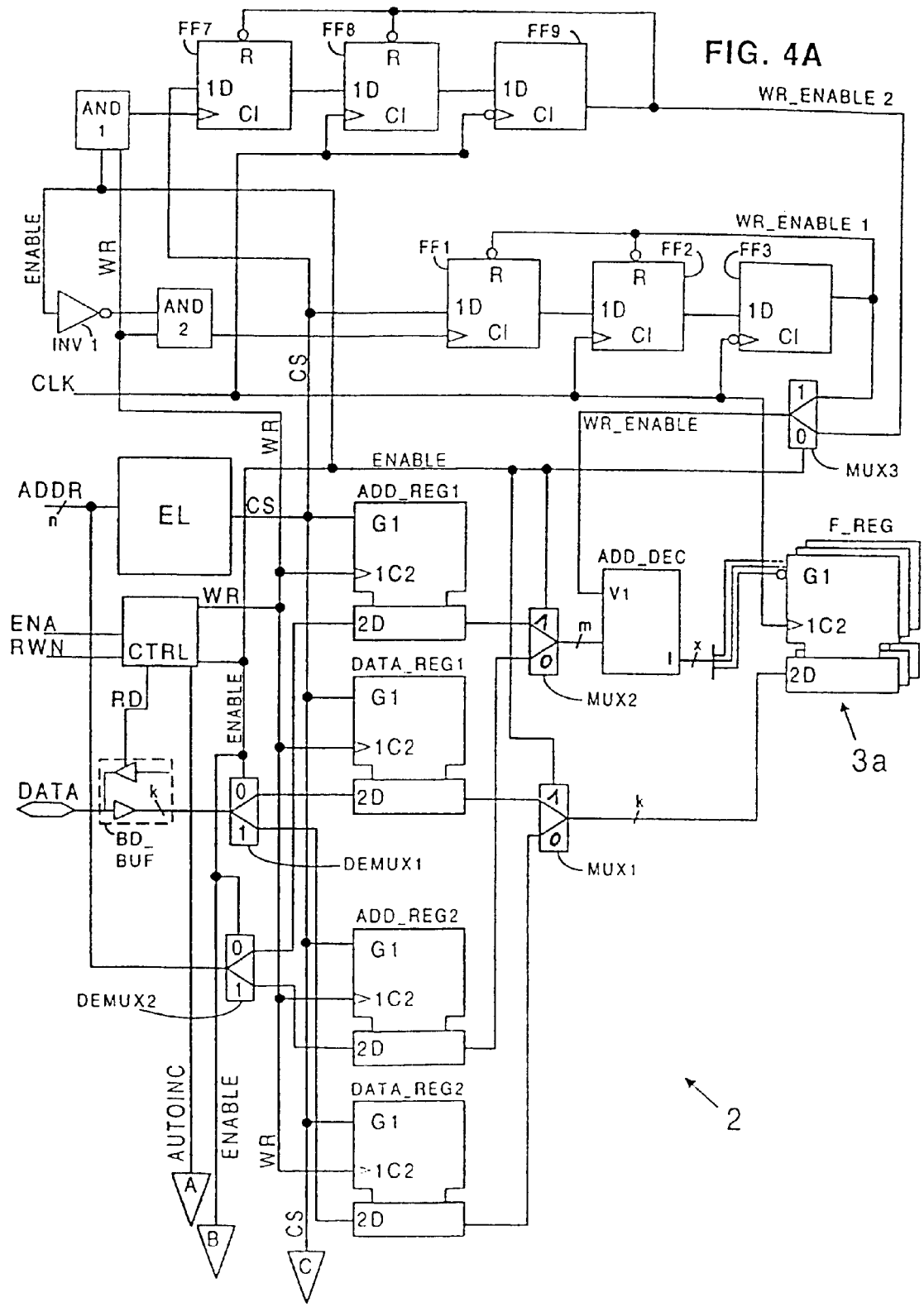

INTERFACE APPARATUS FOR CONNECTING DEVICES OPERATING AT DIFFERENT CLOCK RATES, AND A METHOD OF OPERATING THE INTERFACE

This application is a continuation of PCT/EP98/03642, Jun. 17, 1998.

FIELD OF THE INVENTION

The present invention relates to an interface apparatus for connecting devices operating at different clock rates, and in particular to an interface apparatus for connecting a clocked device provided with an asynchronous bus to a clocked peripheral device provided with a synchronous bus. In addition, the present invention also relates to a method for operating such an interface apparatus.

BACKGROUND OF THE INVENTION

Many digital processor devices like for example digital signal processors (hereinafter referred to as DSP) are provided with an asynchronous data bus which is controlled by timing control signals. In connection with such an asynchronous bus certain difficulties may arise in application situations which have strict timing requirements. For example, when a data bus of a DSP device has to be connected to an Application Specific Integrated Circuit device (hereinafter referred to as ASIC device), which uses only synchronous memory means controlled by a clock signal, timing and/or connection problems may arise.

According to a principle interface that is common to DSP processors of various manufacturers (like, e.g. processors of the DSP_16XX family manufactured by AT&T® or, as a further example, DSP processors provided by Texas Instruments®), an asynchronous data bus of a DSP is controlled by the following signals: signal ADDRESS: specifying the address of memory means (a memory or register) to which data signals DATA are to be written and/or read from; signal RWN (read/write): specifying that dependent on its currently set value ("0" or "1") the DSP processor performs a data transfer operation, i.e. either a write operation or a read operation to or from a peripheral circuit device like an ASIC device and the memory means provided therein; and signal ENA: specifying, dependent on its binary value, whether the DSP device carries out a read/write operation at all, i.e. indicating whether the DSP device is active (ENA=0) or inactive (ENA=1).

The DSP processor also provides a clock signal CKO which may be used for clocking the ASIC operation and also to control the interface. Nevertheless, a clock signal CLK for clocking the ASIC device could be generated elsewhere, such that clock signals supplied to the ASIC device (CLK) and the DSP device (CKO) originate from different sources, respectively. Then, the DSP device and the ASIC device can be independently clocked, and even clocked at different clock rates. Nevertheless, in such a case both devices (DSP and ASIC) could operate with the same clocks and could even be synchronous to each other. In this connection, it has to be noted that for simplified description, the signal CLK for clocking the ASIC device is described hereinafter as if being provided by the DSP device, while this does not limit the invention to such an arrangement.

A schematic block diagram of an ASIC device 3 as a device provided with synchronous memory means 3a being connected via an interface apparatus (I/F) 2 to a DSP device 1 provided with an asynchronous data bus (not shown) is depicted in FIG. 1.

Previously, several interface apparatuses have been proposed for the purpose of interconnecting a DSP device to an ASIC device.

For example, EP-A1-0 649 097 relates to a synchronous approach and discloses an interface between unsynchronized devices, which interface comprises a delay means for synchronizing the write strobe of the first device with the system clock of the second device.

Furthermore, another synchronous approach is proposed in WO-A-96/38793 of the present applicant. According to the method and apparatus for adapting an asynchronous bus to a synchronous circuit as disclosed therein, the timing control signals of the DSP data bus are synchronized to the system clock signal CLK using a flip-flop arrangement.

Moreover, apart from synchronous interfaces, a type of interfaces based on an asynchronous approach has been proposed by the present applicant. In particular, such an asynchronous interface is described in a recent Finnish patent application (FI 972091 filed May 15, 1997) of the same applicant, the present inventor being a co-inventor thereof. As disclosed therein, an asynchronous state machine creates additional signals for internal use in the interface apparatus and/or ASIC device, based on the supplied signals ENA and RWN. In particular, a signal that may be used for burst type read operations from a memory as a clock signal of, for example, an autoincrement counter is generated.

The above mentioned previous solutions, however, merely solved the problem of providing an asynchronous interface, while these solutions will no longer work reliably if the clock rate of the DSP device is much faster than the clock rate of the ASIC device. That is, problems caused due to different clock speeds between the DSP device and the ASIC device can not be prevented by these interface apparatuses.

For example, the DSP device clock frequency is suggested to be 90 MHz, while the ASIC device clock frequency is suggested to be 50 MHz. Since the DSP device may write data with nearly double speed as compared to the ASIC device reading speed, this means that for every writing operation period an extra period of no operation or a "no operation" instruction (hereinafter NOP period/instruction) is required.

This problem will become more and more severe in future when the processing capacity of the used DSP devices is overloaded and it is required to increase the clock frequency of the DSP devices without a possibility to increase the clock frequencies of ASIC devices used.

Stated in other words, timing problems become the more severe the greater the difference in clock frequencies between DSP device and the ASIC device to be connected thereto is.

FIG. 2 of the accompanying drawings represents a timing diagram of above mentioned signals according to the method previously proposed and as disclosed in WO-A-96/38793. In particular, FIG. 2 illustrates a situation, in which there occurs a problem upon connection of a digital ASIC device to a data bus of a DSP device, if the clock frequency of the ASIC device is significantly lower than the clock frequency of the DSP device. As already briefly explained further above, the signal ENA is the DSP device enable signal, indicative of whether the DSP device is active or not with regard to a data transfer operation, i.e. a writing/reading operation to/from the ASIC device; the signal RWN is the signal specifying the writing/reading operation when the DSP device is enabled; ADDRESS indicates the signal transmitted on the address bus of the DSP device; DATA represents the signal transmitted on the data bus of the DSP device; CLK is the system clock of the ASIC device (provided by the DSP device or from an independent external clock signal generating means, as mentioned above). These signals are provided and/or transmitted by the DSP device. Signals ADDRESS1, ADDRESS2, and DATA1, DATA2, indicate address and data values, respectively, applied to the ADDRESS and DATA signal lines, respectively, during periods, during which a specific data is to be written to and/or read from a corresponding specific address in a memory means.

The additionally depicted signal WR_ENABLE is an internal signal generated by the interface apparatus and used only internally within the ASIC device and the interface device. The signal WR_ENABLE actually enables the writing of transmitted data to a memory means of the ASIC device after synchronization.

As shown in the timing diagram, two subsequent writing operations are to be performed: writing DATA1 to ADDRESS1, followed by writing DATA2 to ADDRESS2. Writing is instructed when the signal ENA assumes a low value ("0"), thereby enabling the DSP device and when simultaneously the signal RWN assumes a low value ("0"), thereby instructing writing of data to a memory means. On the other hand, a pair of signal values (ENA, RWN)=(0, 1) represents a reading operation from a memory means, while signal values (ENA, RWN)=(1,X) represent a state in which the DSP device is inactive (disabled or idle, respectively, with "X" being a so-called "Don't care" value for the signal RWN, which signal RWN is of no importance in case the DSP device is inactive).

Apparently, according to the previously proposed method, DATA1 and ADDRESS1 are latched in a respective data register and address register upon a change of at least one of the signals ENA, RWN to the high level or value ("1"). Therefore, at a point of time labeled t1 in FIG. 2 (at the end of a write instruction), the signals ADRESS1 and DATA1 can be assumed to be temporarily stored or latched, respectively. However, the generation of the internal signal WR_ENABLE for this first writing operation, is delayed due to the clocked flip-flop arrangement used for its generation, to thereby be synchronized to the clock signal CLK. Thus, the signal WR_ENABLE occurs at a point of time labeled t3 and shortly before the latching (time point labeled t2) of a pair of data ADRESS2, DATA2 of the subsequent (second) writing operation takes place.

Thus, the signal WR_ENABLE actually enabling the writing, i.e. the transfer of the latched data to memory means at the ASIC device side, is active when ADDRESS2, DATA2 are latched. Consequently, the writing of DATA1 at ADDRESS1 is failed and the writing of DATA2 at ADDRESS2 has been effected too early.

This is the reason for the provision of at least one extra period of no operation instruction cycles (NOP) between writing operations, as required by such previous solutions, and as required for example by the arrangement disclosed in WO-A-96/38793.

Thus, as DSP processor operation speed increases while the processing speed of an ASIC device connected thereto remains constant during the lifetime of the ASIC, a gain and benefit of an increase in the clock frequency of a DSP device will be lost because the interface to the ASIC device requires some NOP instructions between successive read and/or write operations. In addition, similar problems may manifest in case a device from which data are to be read provides the data much faster than a device reading the data can read the data.

SUMMARY OF THE INVENTION

It is therefore an object of the present invention to provide an interface apparatus for connecting a device provided with an asynchronous bus to a peripheral device provided with a synchronous bus as well as a method for operating such an interface apparatus, by means of which the gain and benefit of an increase in the clock frequency of an asynchronous device like a DSP device will not be lost because the interface apparatus to the ASIC device requires some NOP instructions between successive data transfer operations, i.e. read and/or write operations.

This object is achieved by an apparatus for transferring data between a first device and a memory area of memory means of a second device, the memory area being determined by an address, within a system which comprises at least one system clock and in which the first device provides at least a signal indicating data transfer and a signal indicating the direction of data transfer, the apparatus comprising buffer registers for temporarily storing the data to be transferred and the address of the memory area to and/or from which the data are to be transferred, and a control means for controlling said buffer registers to temporarily store said data and address to be transferred in response to the signal indicating that data transfer being active and the signal indicating the direction of data transfer between the first device and the second device, the signals thereby instructing either a write operation or a read operation, characterized by at least two groups of buffer registers for storing data and associated addresses transmitted in consecutive data transfer operations, and in that said control means is adapted to generate a control signal for alternately switching between a first group of buffer registers and a second group of buffer registers of said at least two groups of buffer registers after each of a respective one of consecutive data transfer operations.

Moreover, this object is achieved by a method for transferring data between a first device and a memory area of memory means of a second device, the memory area being determined by an address, within a system which comprises at least one system clock and in which the first device provides at least a signal indicating data transfer and a signal indicating the direction of data transfer, the method comprising the steps of temporarily storing the data to be transferred and the address of the memory area to and/or from which the data are to be transferred in buffer registers, and controlling said buffer registers by means of a control means, to temporarily store said data and address to be transferred in response to the signal indicating that data transfer being active and the signal indicating the direction of data transfer between the first device and the second device, the signals thereby instructing either a write operation or a read operation, characterized by the further steps of providing at least two groups of buffer registers for storing data and associated addresses transmitted in consecutive data transfer operations, generating by means of said control means a control signal for alternately switching between a first group of buffer registers and a second group of buffer registers of said at least two groups of buffer registers after each of a respective one of consecutive data transfer operations.

Advantageous further developments of the present invention are as set out in the respective dependent claims.

In particular, the interface apparatus according to the present invention and the method according to the present invention for operating the same provide the advantage that a simple and reliable control of data transfer operations (reading/writing) is achieved.

Moreover, in contrast to previous solutions which set quite critical requirements for clock frequency ratios for a DSP device and an interface to an ASIC device, according to the present invention, this is no more critical.

This may be even further advantageous if a DSP device uses different clock signals than the ASIC device connected thereto. In this case it is possible to design a system which allows an easy upgrade of a faster processor device without having to worry about a speed upgrade of the ASIC device, while there is also no need for the provision of extra NOP instructions after a speed upgrade of a DSP device.

In addition, by using the proposed method according to the present invention and the circuitry of the apparatus according to the present invention, the formerly required cycles for performing NOPs, i.e. wasted and/or lost cycles of processor time during which no operation was performed, can now be used again for calculation purposes by the DSP device, so that the advantage resulting from a higher clock frequency has not to be sacrificed to NOP instruction cycles.

Furthermore, in case of a writing data transfer, since in the end of every write operation by the DSP device the additionally internally generated ENABLE signal is forced to change its value, always the correct data will be connected to the memory means specified by the correct address, without any additional NOP cycle between successive writing operations being necessary.

BRIEF DESCRIPTION OF THE DRAWINGS

In the following, the invention will be described in greater detail by way of example with reference to the accompanying drawings in which.

DESCRIPTION OF PREFERRED EMBODIMENTS

Preferred embodiments of the present invention are described herein below in detail with reference to the drawings.

In particular, according to the present invention, NOPs between two consecutive write operations to be performed by a DSP device are advantageously avoided due to the provision of at least two temporary address and data registers. In these data and address registers, a first data and address will be latched to a first data and address register during a first data transfer operation (e.g. a first write operation), and during a subsequent second data transfer operation (e.g. a second write operation) a second data and address will be latched in a second data and address register.

According to this method, writing operations may be reliably finished without requiring extra NOPs between subsequent writing operations. Similarly, this applies to consecutive read operations or to a case, in which a read operation is performed between consecutive write operations.

Figure 1:
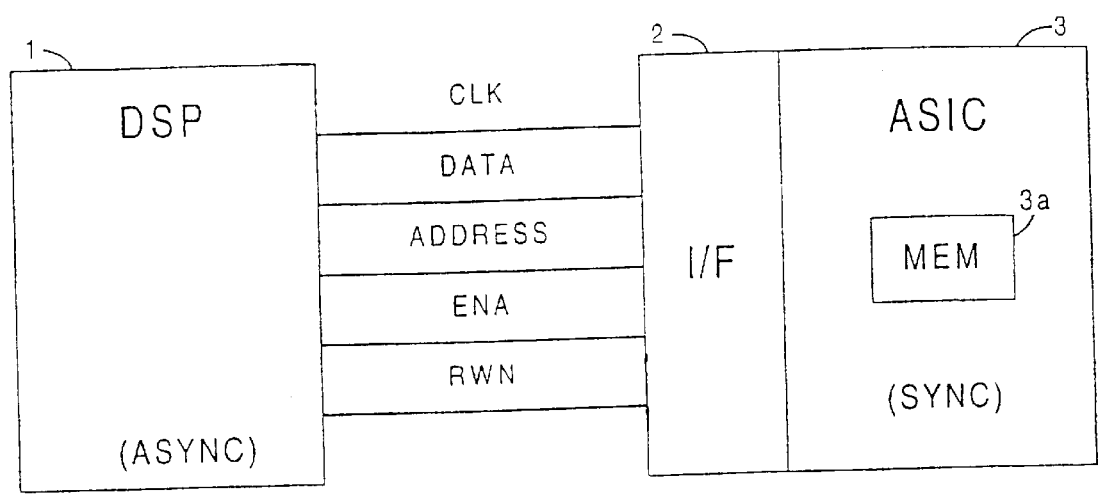
FIG. 1 shows a block diagram schematically showing the principle of an interface apparatus for connecting a device like a DSP device provided with an asynchronous data bus to a device like an ASIC device provided with synchronous memory means together with signals transmitted.
Figure 2:
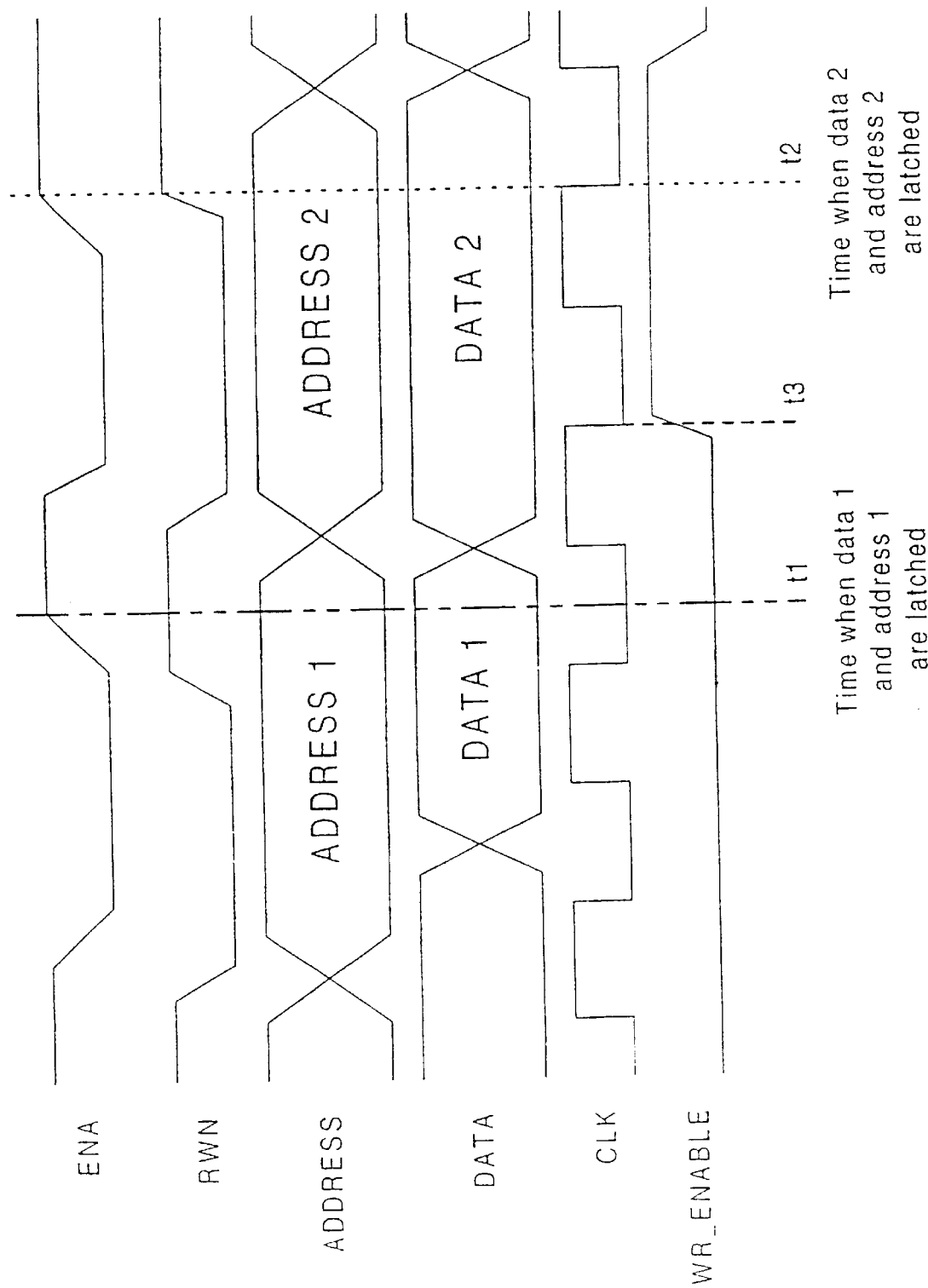
FIG. 2 illustrates a waveform diagram of timing signals according to the method and apparatus previously proposed and disclosed in document WO-A-96/38793.
Figure 3:
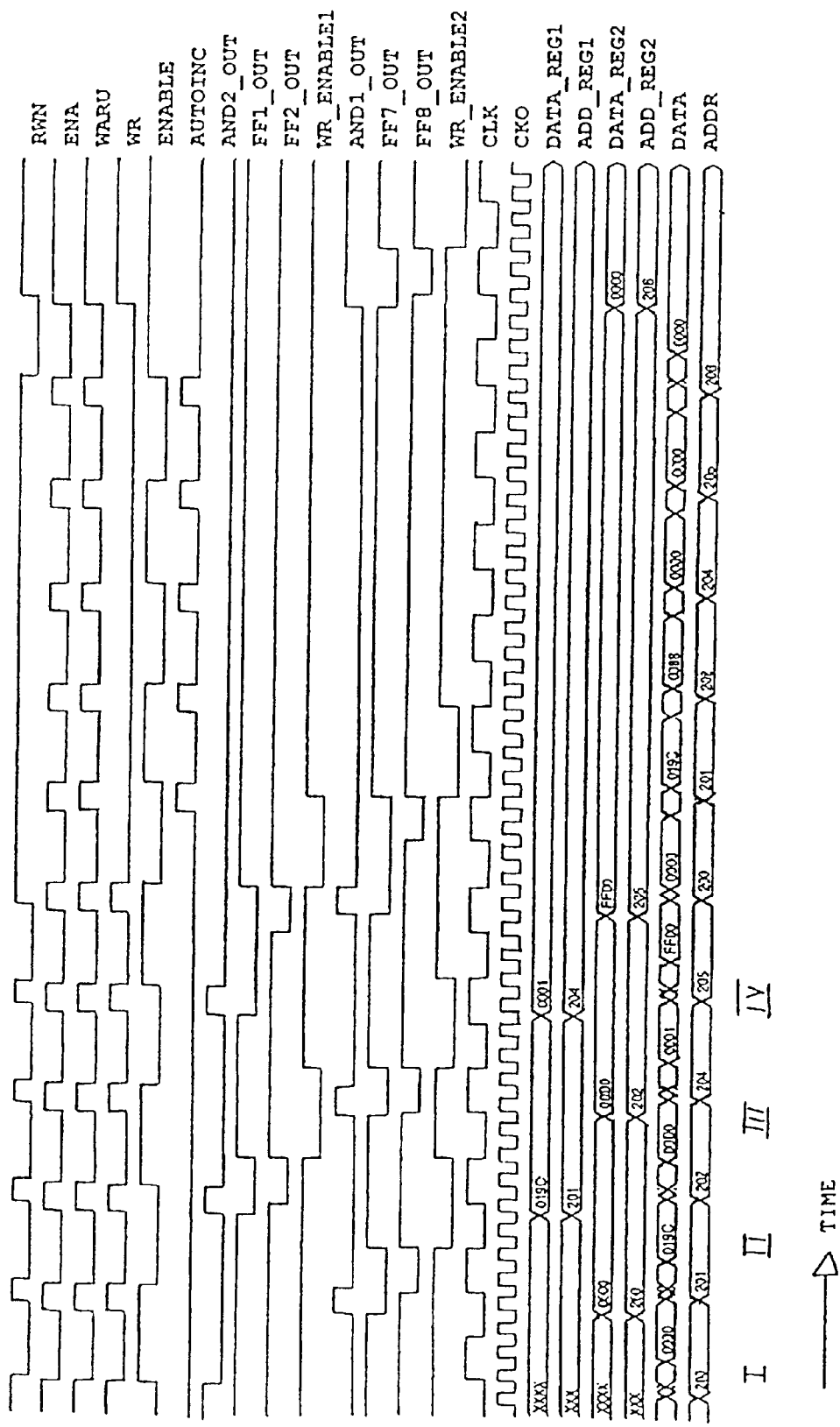
FIG. 3 illustrates a waveform diagram of timing signals illustrating the proposed method and occurring in the apparatus according to the present invention.

FIG. 3 shows a timing diagram schematically exemplifying the timing relationship of control signals involved. Those signals which are correspond to those previously explained in connection with FIG. 2 bear the same names. A difference resides in the fact that according to the present invention a new, additional signal ENABLE is generated. This signal ENABLE enables the respective temporary data and address registers to be selected, in that it controls respective multiplexer and demultiplexer circuits to thereby select an appropriate one of temporary registers during a respective data transfer operation. For example, if the ENABLE signal assumes a high value (logic "1" level) the data and address bus values are latched to specific temporary data and address registers, while if the ENABLE signal assumes a low value (logic "0" level) the data and address bus values are latched to specific different temporary data and address registers.

FIG. 3 illustrates the principle of the present invention. As shown in FIG. 3, the signal ENABLE is high (logic "1" level) during a first (I) writing operation (RWN=0, ENA=0). Upon a rising edge of a signal WR, data and address values applied to DATA and ADDRESS signal lines are latched to temporary registers DATA_REG2, ADD_REG2, respectively. Address and data values subsequently applied during a following writing operation (II) are then buffered to differing address and data registers (ADD_REG1, DATA_REG1) upon the following rising edge of the signal WR.

The actual writing of respective buffered data to a correspondingly specified (buffered) address of a memory or register F_REG of the peripheral device, like e.g. an ASIC device, occurs upon the rising edge of system clock CLK of the ASIC device, when signals WR_ENABLE1 or WR_ENABLE2, respectively, are low ("0" level). Stated in other words, when WR_ENABLE2 is low and a rising edge of CLK occurs, data buffered in DATA_REG2 are written to the address of a memory F_REG specified by the value buffered in ADD_REG2. Similarly, WR_ENABLE1 is low and a rising edge of CLK occurs, data buffered in DATA_REG1 are written to the address of a memory F_REG specified by the value buffered in ADD_REG1.

Apparently, a new data and address has been latched to registers DATA_REG1 and ADD_REG1 before the previous data from DATA_REG2 have been written to the memory area of F_REG specified by the address value buffered in ADD_REG2.

This is the basic concept of the present invention. Therefore, even if the ASIC device clock CLK is slow in comparison with the clock signal CKO of the DSP device, the write operations will not fail. In particular, failure will be prevented even if there is overlap between internal write operation and external write operation, as set out above.

Thus, according to the proposed method and the interface apparatus operated accordingly, previous data and address values are not overwritten before internal writing, i.e. writing to the memory means specified, is finished. In particular, since the signal ENABLE will be forcibly caused to change its value in the beginning of every write operation instructed by the DSP device, correct data will be connected to the correct address without the need for providing extra NOPs between consecutive write operations.

With reference to FIG. 4, the structure of an embodiment of the present invention is described by way of example.

FIG. 4 illustrates details of an interface apparatus according to the present invention in form of a block diagram.

From a DSP device (not shown) the signals ADDR, DATA, ENA, RWN are externally supplied to the interface apparatus 2. The signal CLK may be provided by the DSP device, but may also be supplied by any other external device or the ASIC device itself. Supplied data signals DATA are to be written to a specific address of a synchronous memory means 3a provided in e.g. an ASIC device connected thereto, the address being specified by the signal ADDR.

In FIG. 4, the memory means 3a is represented by a plurality of functional registers F_REG, which may already be associated to the ASIC device, although depicted as if provided in the interface apparatus. Each register has a data storage capacity of k bit data. The number of the registers is determined by the effective width of the address bus. This means that using an address bus of x bit width, $2^x$ addresses may be coded and $2^x$ individual registers F_REG are provided, each of which being clocked with the clock signal CLK (rising edge of CLK) which is for example provided by the DSP device or an external clock signal generator.

A signal ADDR of n bit width is split in a first address of m bit width for addressing effective memory addresses or functional registers F_REG, respectively, while a remaining part of the address of n−m=p bit (upper most significant bits) is supplied to an enable logic circuit EL. Based on the upper p bits a chip select CS is generated. This chip select signal CS determines whether an individual synchronous memory and/or ASIC device as such is selected or not, in case there are more than one ASIC devices connected to a DSP device. The enable logic circuit EL is adapted to provide an output signal assuming a level of CS="0" in case the p most significant bits of the address signal ADDR transmitted on the address bus equal a reference address of the same bit width arranged for within the circuit EL. It is clear that the circuit EL may be formed of comparator circuits which perform a comparison on a per bit basis of the supplied address signal and the reference address.

The signal CS is fed to data input terminal 1D of flip-flop means FF1, FF7, FF4, and FF10. The signal CS is also supplied to gate terminals (or select terminals) G1 of temporary address and data registers ADD_REG1, ADD_REG2, DATA_REG1, and DATA_REG2, respectively.

Data signals DATA of k bit width are supplied from the DSP device to a bi-directional buffer BD_BUF for being written via the interface apparatus 2 and its internal temporary registers to a synchronous memory means 3a, like functional, registers F_REG, provided at the side of the ASIC device. Alternatively, in case of a reading operation from a memory means, data signals are transmitted via said bi-directional buffer and said data terminal to the DSP device. In FIG. 4, the terminal of the bi-directional buffer depicted as being not connected may be connected to a memory means or register from which data are to be read. However, for the present description, this connection is omitted for reasons of a simplified circuit representation.

The bidirectional buffer is controlled by a signal RD instructing a read operation, the signal being internally generated in the interface apparatus.

In particular, based on the externally supplied signals ENA and RWN a control circuit CTRL generates various control signals for internal use within the interface apparatus. In addition to the read instruction signal RD, the circuit CTRL is adapted to generate an autoincrement signal AUTOINC, a write instruction signal WR, and the above explained enable signal ENABLE.

Figure 4B:
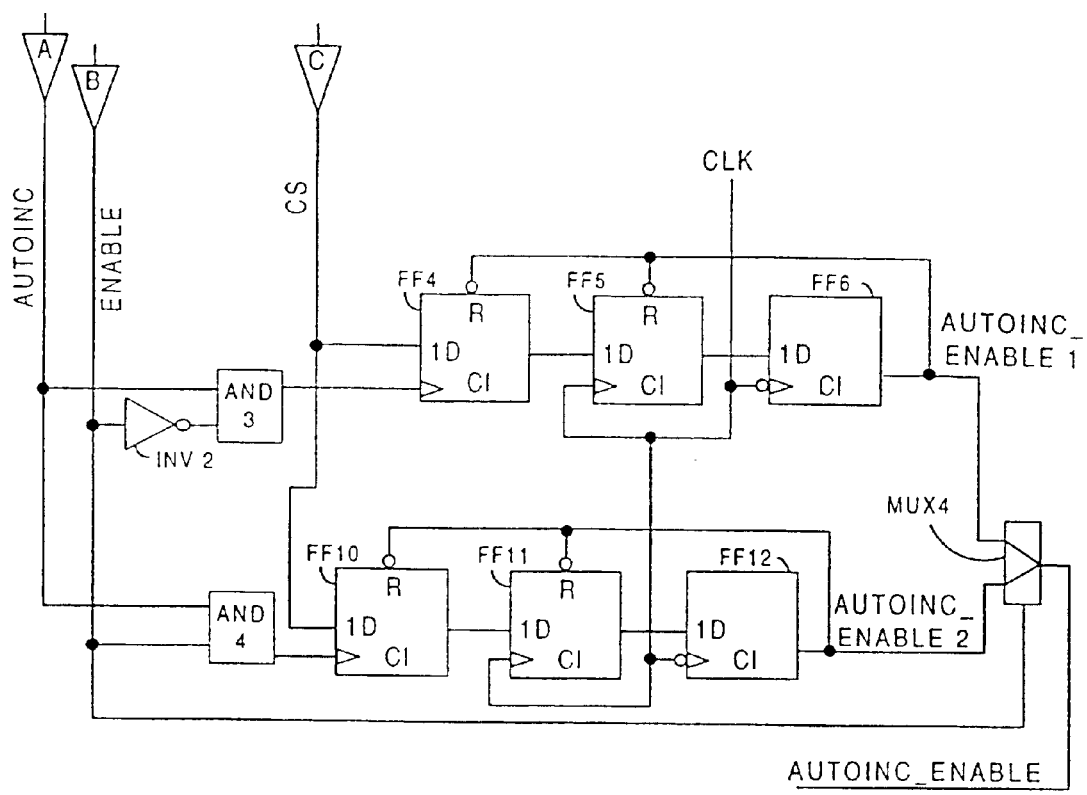
FIG. 4 (consisting of FIG. 4A & FIG. 4B) depicts an embodiment of the interface apparatus according to the present invention in the from of a block diagram.

According to the recent patent application FI 972091, the signal AUTOINC is generated as one output signal of the CTRL circuit, which is implemented as an asynchronous state machine. The AUTOINC signal can be used for burst type read operations from a memory as a clock for example of an autoincrement counter. To this end, the signal AUTOINC is logically combined with the inverted and non-inverted signal ENABLE via logic gates AND3, AND4, respectively. The respective results output from the AND-gates AND3, AND4 are supplied to clock terminals of flip-flop means FF4, FF10, respectively. Flip-flop means FF4 is interconnected to flip-flop means FF5, FF6, while flip-flop means FF10 is interconnected to flip-flop means FF11, FF12. The output signals AUTOINC_ENABLE1 and AUTOINC_ENABLE2 of flip flop means FF6 and FF12, respectively, are selectively output via a multiplexer means MUX4 as an AUTOINC_ENABLE signal to be used for burst type read operations. The multiplexer is controlled by the signal ENABLE. The detailed circuitry of this circuit part is as shown in FIG. 4B.

However, the present description of the invention rather focuses on the description of the write operation as an example for data transfer operation. Therefore, a further description of the use of the AUTOINC signal is therefore omitted. Nevertheless, it should be noted that the signal AUTOINC can be used (directly or indirectly) for resetting status registers or functional registers F_REG, respectively, when applied to reset input terminals thereof (not shown).

Furthermore, the write instruction signal WR is generated as a further output signal of the CTRL circuit. The CTRL circuit may be implemented as an asynchronous state machine as described further below.

The signal WR thus generated by the circuit CTRL is applied to clock input terminals 1C2 of each respective data and address register DATA_REG1, DATA_REG2, ADD_REG1, and ADD_REG2. In addition, the signal WR is supplied to AND gates AND1 and AND2, respectively, by means of which gates it is logically combined with the non-inverted and the inverted signal ENABLE, respectively. The output (AND1_OUT) of gate AND1 is supplied to the clock terminal C1 of the flip-flop means FF7, and the output (AND2_OUT) of the gate AND2 is supplied to the clock terminal C1 of the flip-flop means FF1.

Upon being clocked by the signal AND2_OUT, AND1_OUT, the input data (CS at terminal 1D) of flip-flop means FF1, FF7 are output of the respective flip-flop means and input to respective flip-flop means FF2, FF8. With the subsequent rising edge of the clock signal CLK, this signal is output to a respective next flip-flop means FF3, FF9, and with the following falling edge of CLK (due to the inverted clock input terminal of flip-flop means FF3, FF9), the signal is output at the respective output terminal of flip-flop means FF3, FF9 as the respective internal write enable signal WR_ENABLE1, WR_ENABLE2. Each of the signals WR_ENABLE1, WR_ENABLE2 is fed back to a reset terminal R of the flip-flop means FF1, FF2 and FF7, FF8, respectively, for resetting the same. The signals WR_ENABLE1, WR_ENABLE2 are supplied to a multiplexer MUX3 which is controlled by the signal ENABLE, to be output as the signal WR_ENABLE. This signal WR_ENABLE is input to a terminal V1 of an address decoder ADD_DEC (to be described later).

It is to be noted that the flip-flop arrangements (FF1 to FF3, FF7 to FF9) for providing the WR_ENABLE signal (as well as the corresponding flip-flop arrangements for the AUTOINC_ENABLE signal) are provided in duplicate because otherwise the WR_ENABLE and/or AUTOINC_ENABLE will rise during these flip-flops are reset by a previous write/read operation.

Moreover, the circuit CTRL generates the above explained signal ENABLE controlling the plurality of at least two respective data and address registers provided for in the interface apparatus. The control of the registers is effected such that at a first (I in FIG. 3) writing operation (ENA, RWN)=(0, 0), ENABLE=1, the first supplied data and address values are latched in one data and address register (DATA_REG2, ADD_REG2), respectively, while during a subsequent second writing (II in FIG. 3) operation (ENA, RWN)=(0, 0), ENABLE=0, the subsequently supplied data and address values are latched in another data and address register (DATA_REG1, ADD_REG1), respectively. In particular, the ENABLE signal forcibly changes its value upon each new writing operation. This means that the ENABLE signal will be clocked by the falling edge of the signal WARU which is obtained as a result of the logical OR-operation between the signals WR and AUTOINC. Hence, it will change its value after every cycle of the signal WARU (and thus represents a kind of divided clock from the combination of the signals WR and AUTOINC).

The ENABLE signal is glitch free, since it is derived from the glitch free signals WR and AUTOINC. Therefore, the ENABLE signal can be used as a control signal for clocking the flip-flop means (FF1, FF7, as well as FF4, FF10), in order to generate respective WR_ENABLE and AUTOINC_ENABLE signals.

Such functionality may be implemented by implementing the circuit CTRL as an asynchronous state machine, or by any other suitable logic circuit.

For example, one possibility to implement the circuit CTRL as an asynchronous state machine could be based on the subsequent Karnaugh map. ENA, RWN are the above explained signals supplied by the DSP device, and A, B, and C are internal state variables representing states occurring within the circuit CTRL.

TABLE 1

KARNAUGH MAP FOR CTRL CIRCUIT

| ABC ENA, RWN | 000 | 001 | 011 | 010 | 110 | 111 | 101 | 100 |
|---|---|---|---|---|---|---|---|---|
| 00 | 010 | 001 | 001 | 011 | 010 | 110 | 110 | 110 |
| 01 | 010 | 001 | 001 | 010 | 010 | 110 | 110 | 110 |
| 11 | 000 | 000 | 001 | 110 | 110 | 110 | 110 | 110 |
| 10 | 000 | 000 | 001 | 110 | 110 | 110 | 110 | 110 |

Respective state transitions are for example defined by the following logic equations ("!" representing the logical NOT function, "*" the logical AND function, and "+" the logical OR function):

$$NEXT\_A <= (A*C + A*!B + ENA*A + ENA*B*!C)*XRESET$$

$$NEXT\_B <= (A + B*!C + !ENA*!B*!C)*XRESET$$

$$NEXT\_C <= (!ENA*!A*C + !A*B*C + !ENA*!RWN*!A*B)*XRESET$$

with XRESET being a reset signal supplied to the circuit CTRL at a reset terminal (not shown in FIG. 4) in order to reset the circuit with the falling edge of the signal XRESET. Then, the signals RD, WR, and AUTOINC output by the circuit CTRL are given by $$RD <= !A*B*!C,$$

$$WR <= !(A+B+C),$$

and $$AUTOINC <= A*B*!C \text{ (or just direct } A\text{)}.$$

Figure 5:
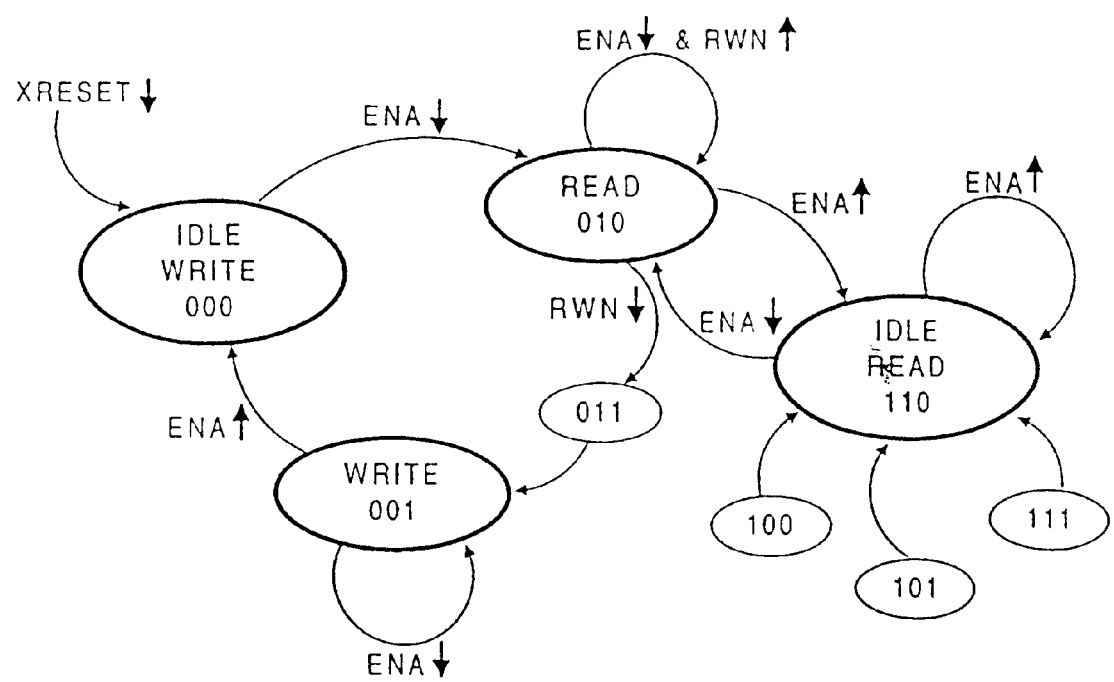
FIG. 5 is a state diagram illustrating an example of the control logic as implemented in the control circuit CTRL realized as an asynchronous state machine and as shown in FIG. 4A.

FIG. 5 shows the corresponding state diagram of the circuit CTRL when implemented as an asynchronous state machine. In FIG. 5, four states are stable (IDLE WRITE, WRITE, READ, IDLE READ), while all other states definable by the state variables A, B, C are intermediate states. The state transitions are indicated by labeling the respective transition with the respectively changing signal (or signal combination) (an upward arrow corresponds to a rising edge or a high signal level, respectively, while a downward arrow corresponds to a falling edge or a low signal level, respectively.)

The above example of the control logic implemented in circuit CTRL is a possible example only, and other implementations of the asynchronous state machine are conceivable.

In order to alternately switch between data and address registers DATA_REG1, ADD_REG1 on the one hand and data and address registers DATA_REG2, ADD_REG2 on the other hand, the signal ENABLE is used as a control signal for switching means or demultiplexing means DEMUX1, DEMUX2. The switching means DEMUX1 is associated to the data registers DATA_REG1, DATA_REG2 and selectively supplies an input k-bit data signal DATA either to the data input terminal 2D of the register DATA_REG1 (ENABLE=0) or to the data input terminal 2D of the register DATA_REG2 (ENABLE=1), depending on the value of the signal ENABLE. The switching means DEMUX2 is associated to the address registers ADD_REG1, ADD_REG2 and selectively supplies m-bit of an input address signal ADDRESS (m=n−p) either to the register ADD_REG1 (input terminal 2D) (ENABLE=0) or to the register ADD_REG2 (input terminal 2D) (ENABLE=1), depending on the value of the signal ENABLE. It is to be noted that data register DATA_REG1 is always selected in combination with address register ADD_REG1, and likewise DATA_REG2 is always selected together with ADD_REG2, in order to correctly latch a pair of data and address values. In FIG. 4, the respective levels of the signal ENABLE for controlling the switching means DEMUX1, DEMUX2 is indicated at the respective connection path by "0" or "1", respectively. p Furthermore, the signal ENABLE is also applied as an control signal to switching means or multiplexing means MUX1, MUX2, and MUX3. The switching means MUX1 is associated to the data registers DATA_REG1, DATA_REG2 and selectively outputs a k-bit data signal DATA either from the register DATA_REG1 (ENABLE=1) or from the register DATA_REG2 (ENABLE=0), depending on the value of the signal ENABLE. The switching means MUX2 is associated to the address registers ADD_REG1, ADD_REG2 and selectively outputs an m-bit address value either from the register ADDR_REG1 (ENABLE=1) or from the register ADDR_REG2 (ENABLE=0), depending on the value of the signal ENABLE.

In particular, it has to be noted that the multiplexing means MUX1, MUX2 and the demultiplexing means DEMUX1, DEMUX2 are driven in a mutually opposite manner. This means, that for example during a period in which data values are latched in data and address registers DATA_REG1, ADD_REG1 (ENABLE="0") and the demultiplexing means DEMUX1, DEMUX2 are driven to connect the respective signal lines accordingly, the multiplexing means MUX1, MUX2 are driven in such a manner that the output of data and address registers DATA_REG2, ADD_REG2 (ENABLE=0) are selected and the data values can be written to a correspondingly selected and addressed register.

When a certain pair of registers DATA_REG, ADD_REG is selected in order that the data values latched or buffered therein are read out, currently arriving new data and address values are buffered in the other of the pairs of registers. The data values being read out from a respectively selected register are supplied (k-bit data) to a data input terminal 2D of a functional register F_REG specified by the address. The m-bit address value being read out from a respectively selected register is supplied to an input terminal of the address decoder ADD_DEC.

The address decoder ADD_DEC within the interface apparatus distributes (or propagates) the signal WR_ENABLE for the circuit section determined by the upper p-bit of the address signal ADDRESS transmitted. The signal WR_ENABLE is either the signal WR_ENABLE1 (if ENABLE=1) or WR_ENABLE2 (if ENABLE=0) previously described, and selected by means of the switching means (multiplexer) MUX3, depending on the value of the signal ENABLE.

In case the write operation is intended to be performed for a memory means like a RAM memory (not shown), a further internal signal is generated by the decoder ADD_DEC to be supplied for enabling the memory. In such a case the output of the decoder has a width of x-bit (x being greater than m). However, for the simplified example depicted it may be assumed that m equals x since merely functional registers are addressed.

Furthermore, in the illustrated example the ENABLE signal is a one bit signal, since only two groups of data and address registers are provided. However, in case that more than two register groups are provided, the ENABLE signal must have a correspondingly increased number of bits for controlling the multiplexing/demultiplexing means. Generally, the ENABLE signal must be implemented as a signal of z bit width in order that $2^z$ register groups of temporary data and address registers can be controlled and alternately switched between. In such a case of more than two register groups, also the number of write enable signals WR_ENABLE1, WR_ENABLE2 would have to be increased accordingly.

The present invention has been described herein above in detail with regard to a write operation as a data transfer operation. Nevertheless, it should be apparent to those skilled in the art that the proposed structure according to the invention could be adapted in order to be used in the case of consecutive read operations, or in case that there is one read operation between consecutive write operations. In such a case, for example, the buffer registers DATA_REG, ADD_REG would have to be implemented as bi-directional registers. The direction of data input and data output thereof being controlled on the basis of the signals read RD and write WR. Apparently, at each input/output terminal of such bi-directional registers, multiplexing and demultiplexing means would have to be provided for, being selected according to the specific data transmission direction of the registers on the basis of the signals RD, WR. Moreover, the terminal of the bi-directional buffer BD_BUF, for reasons of simplicity of the drawing shown in FIG. 4 as being not connected, would have to be connected to the multiplexing means of the registers at the output side in a read operation.

In case of a read operation as a data transfer operation, the reading occurring between consecutive write operations may set or reset status information in a status register or function register F_REG, respectively. In this kind of read operation, the address at which data are read from must be temporarily stored in a temporary register (ADD_REG1 or ADD_REG2). In this case, the signal AUTOINC could be used to set/reset status information, while the latched address will serve as a pointer to the corresponding status register. Such a procedure could be carried out in case the ASIC device performs some operations and sets a status bit when the result of the operation is available in a result register. The ASIC device then waits during reading thereof by the DSP device (and a new result could be written to the result register). When the DSP device reads the result, the read operation will reset the corresponding status bit and the ASIC device may continue operation.

Although the above description has mainly been made under the assumption of a negative active logic in which an active signal has a low level, it is evident to those skilled in the art that a suitably modified system may be implemented using positive active logic in which an active signal has a high level. Moreover, although the description herein above in connection with the chip select signal CS (FIG. 4) has been made by referring to the example of the chip select signal CS being derived from the supplied address signal, another implementation may be conceivable. For instance, the signal CS could be implemented as being hard wired (an additional signal line in the interface) with a signal of logic "0" or logic "1" being applied thereto by the DSP device. Of course, a thus hard wired signal CS may have more than one bit width, depending on how many ASIC devices are to be addressed. Furthermore, means for address decoding (like ADD_DEC enabled by WR_ENABLE) may also be conceivable to be enabled by the signal AUTOINC_ENABLE. This is necessary in case the AUTOINC_ENABLE signal is used to reset some status registers after a possible reading operation, as described herein above.

Finally, for easier cross reference between the timing diagram indicated in FIG. 3 and the corresponding circuit as shown in FIG. 4A and FIG. 4B, reference is made to the following table, listing the signal names and indicating their occurrence within the block diagram.

TABLE 2

SIGNALS LISTED IN FIG. 3 WITH CORRESPONDENCE IN CIRCUIT DIAGRAM SHOWN IN FIG. 4

| SIGNAL NAME (FIG. 3) | OCCURRENCE IN CIRCUIT (FIG. 4) |
| --- | --- |
| RWN | read/write signal supplied from DSP |
| ENA | enable signal supplied from DSP |
| WARU | (WR + AUTOINC) [unshown], used to clock ENABLE |
| WR | write pulse, output of CTRL |
| ENABLE | selection signal, output of CTRL |
| AUTOINC | autoincrement enable for burst mode reading |
| AND2_OUT | output of gate AND2, for clocking FF1 |
| FF1_OUT | output of FF1 |
| FF2_OUT | output of FF2 |
| WR_ENABLE1 | write enable signal 1, output of FF3 |
| AND1_OUT | output of gate AND1, for clocking FF7 |
| FF7_OUT | output of FF7 |
| FF8_OUT | output of FF8 |
| WR_ENABLE2 | write enable signal 2, output of FF9 |
| CLK | ASIC system clock |
| CKO | DSP clock (not shown) |
| DATA_REG1 | temporary data register DATA_REG1 |
| ADD_REG1 | temporary address register ADD_REG1 |
| DATA_REG2 | temporary data register DATA_REG2 |
| ADD_REG2 | temporary address register ADD_REG2 |
| DATA | data bus supplied from DSP |
| ADDR | address bus supplied from DSP |

It should be understood that the above description and accompanying figures are intended to illustrate the present invention by way of example only. The preferred embodiments of the method and interface apparatus may thus vary within the scope of the attached claims.

What is claimed is:

1. An apparatus for transferring data between a first device and a memory area of memory means of a second device, the memory area being determined by an address, within a system which comprises at least one system clock and in which the first device provides at least a first signal indicating data transfer and a second signal indicating the direction of data transfer, the apparatus comprising:

buffer registers for temporarily storing the data to be transferred and the address of the memory area to and/or from which the data are to be transferred; and a control means for controlling said buffer registers to temporarily store said data and address to be transferred in response to the first signal indicating that data transfer being active and the second signal indicating the direction of data transfer between the first device and the second device, the first and second signals thereby instructing either a write operation or a read operation, wherein at least two groups of buffer registers for storing data and associated addresses transmitted in consecutive data transfer operations, and wherein said control means is adapted to generate a control signal for alternately switching between a first group of buffer registers and a second group of buffer registers of said at least two groups of buffer registers after each of a respective one of consecutive data transfer operations.

2. The apparatus according to claim 1, wherein said control means is adapted to forcibly change said control signal upon a transition of the first signal or the second signal, the signals thereby either indicating no data transfer or indicating the direction of data transfer.

3. The apparatus according to claim 1, wherein said control signal is supplied as a drive signal to input switching means, and the input switching means selectively supplies the data to be transmitted either to the buffer register of the first group of buffer registers or to the buffer register of the second group of buffer registers, and the input switching means selectively supplies the address to be transmitted either to the buffer register of the first group of buffer registers or to the buffer register of the second group of buffer registers.

4. An The apparatus according to claim 1, wherein said control signal is supplied as a drive signal to output switching means, the output switching means is adapted to selectively output the data temporarily stored in the buffer registers to the memory means, and the output switching means is adapted to selectively output the address temporarily stored in the buffer registers to an address decoder.

5. An The apparatus according to claim 4, wherein the input and output switching means are adapted to be controlled by the control signal such that while the supply of data and addresses to a group of buffer registers for being temporarily stored therein is enable, the output of data and addresses of said group of buffer registers in inhibited.

6. The apparatus according to claim 5, wherein the input and output switching means are adapted to be controlled by the control signal such that it is assured that when the first group of buffer registers is enabled to temporarily store supplied data and addresses, the second group of buffer registers is enabled to output data and addresses previously stored therein during a preceding writing operation.

7. A method for transferring data between a first device and a memory area of memory means of a second device, the memory area being determined by an address, within a system which comprises at least one system clock and in which the first device provides at least a first signal indicating data transfer and a second signal indicating the direction of data transfer, the method comprising the steps of:

temporarily storing the data to be transferred and the address of the memory area to and/or from which the data are to be transferred in buffer registers;

controlling said buffer registers by means of a control means, to temporarily store said data and address to be transferred in response to the first signal indicating that data transfer being active and the second signal indicating the direction of data transfer between the first device and the second device, the first and second signals thereby instructing either a write operation or a read operation;

providing at least two groups of buffer registers for storing data and associated address transmitted in consecutive data transfer; and generating by means of said control means a control signal for alternately switching between a first group of buffer registers and a second group of buffer registers of said at least two groups of buffer registers after each of a respective one of consecutive data transfer operations.

8. The method according to claim 7, wherein said control signal is forcibly changed upon a transition of the first signal or the second signal, the signals thereby either indicating no data transfer or indicating the direction of data transfer.

9. The method according to claim 7, further comprising the step of:

supplying said control signal as a drive signal to input switching means, and selectively supplying the data to be transmitted either to the buffer register of the first group of buffer registers or to the buffer register of the second group of buffer registers by means of the input switching means, and selectively supplying the address to be transmitted either to the buffer register of the first group of buffer registers or to the buffer register of the second group of buffer registers by means of the input switching means.

10. The method according to claim 7, wherein the supplying step further comprises supplying said control signal as a drive signal to output switching means, and selectively outputting the data temporarily stored in the buffer registers to the memory means by means of the output switching means, and selectively outputting the address temporarily stored in the buffer registers to an address decoder by means of the output switching means.

11. The method according to claim 10, wherein the controlling step further comprises controlling the input and output switching means by the control signal such that while the supply of data and addresses to one group of said at least two groups of buffer registers for being temporarily stored therein is enabled, the output of data and addresses of said group of buffer registers in inhibited.

12. The method according to claim 11, wherein the controlling step further comprises controlling the input and output switching means by the control signal such that it is assured that when the first group of buffer registers is enabled to temporarily store supplied data and addresses, the second group of buffer registers is enabled to output data and addresses previously stored therein during a preceding data transfer operation.

* * * * *